United States Patent [19]
Peterson et al.

[11] Patent Number: 6,105,476
[45] Date of Patent: Aug. 22, 2000

[54] ADJUSTABLE ALIGNMENT

[75] Inventors: John L. Peterson, Nashville; Mark G. Charleton, Hermitage; Lawrence A. Ballew, Lavergne; Fred E. Chaffin, Lebanon, all of Tenn.

[73] Assignee: Peterson Tool Company, Nashville, Tenn.

[21] Appl. No.: 09/311,982

[22] Filed: May 14, 1999

Related U.S. Application Data

[62] Division of application No. 09/016,472, Jan. 30, 1998, Pat. No. 6,012,364.

[51] Int. Cl.[7] ............................. B23B 29/16; B23B 1/00
[52] U.S. Cl. .............................. 82/1.11; 82/161; 82/157; 82/12; 407/83; 407/87
[58] Field of Search .................... 82/61, 64, 65, 82/86, 88, 100, 157, 161, 1.11, 1.5, 12, 19, 83; 407/77, 81, 83, 87, 90

[56] References Cited

U.S. PATENT DOCUMENTS

| | | | |
|---|---|---|---|
| 727,440 | 5/1903 | Rabiger | 82/12 |
| 2,151,379 | 3/1939 | Flaker | 82/157 |
| 2,158,798 | 5/1939 | Lange et al. | 82/157 |
| 2,323,324 | 7/1943 | Hanson | 82/157 |
| 2,364,320 | 12/1944 | Schlitters | 82/35 |
| 2,687,664 | 8/1954 | Smith | 82/157 |
| 3,063,318 | 11/1962 | Schlappal | 407/83 X |
| 3,094,024 | 6/1963 | Synk et al. | 82/157 |
| 3,566,723 | 3/1971 | Oborne | 82/36 |
| 3,576,145 | 4/1971 | Bernath | 82/157 |
| 3,739,822 | 6/1973 | Loof | 82/12 |
| 4,292,865 | 10/1981 | Liu et al. | 407/83 X |
| 5,888,030 | 3/1999 | Retondo | 407/87 X |

OTHER PUBLICATIONS

Brochure entitled "C.J. Winter Model 108 Shavetool Holder" (undated but admitted to be prior art).
Brochure entitled "Davenport Ordering Guide—Screw Machine Tool Co., Inc." (undated but admitted to be prior art).
Brochure of Jersey Manufacturing Co. (1980).
Brochure entitled "C.J. Winter Machine 119SA & 120SA Dovetail Shavetools" (undated but admitted to be prior art).
Brochure entitled "Shaving/Dovetail Tool Type—Heavy Duty" (undated but admitted to be prior art).
Brochure of Screw Machine Tool Co. (1969).
Drawing page of Empire Tool Company (1991).
Advertising sheet of Somma (undated but admitted to be prior art).
Brochure of The Langolf Company (undated but admitted to be prior art).

*Primary Examiner*—Henry W. H. Tsai
*Attorney, Agent, or Firm*—Lucian Wayne Beavers Waddey & Patterson

[57] ABSTRACT

A toolholder apparatus includes a head, a cutting tool mounting fixture attached to the head for holding the cutting tool, and a floating roller assembly pivotally mounted relative to the head. These components are arranged and constructed so that during the cutting of a workpiece with the cutting tool the floating roller assembly can pivot about a pivotal axis relative to the head to allow the floating roller assembly to align with the workpiece. A mechanism is also provided for accomplishing the initial adjustment of alignment of the cutting tool with the rotating workpiece. This mechanism includes a cylindrical shaft extending from the head, and having an eccentric cam follower lug extending transversely from the shaft. A mounting block has a cylindrical bore disposed therethrough, and the shaft is received through the bore of the mounting block. A cam piece is slideably disposed within the mounting block to rotate the shaft as the cam piece slides relative to the mounting block. An adjuster is provided for moving the cam piece relative to the mounting block. Methods are also provided for machining an elongated rotating workpiece utilizing the apparatus described.

13 Claims, 5 Drawing Sheets

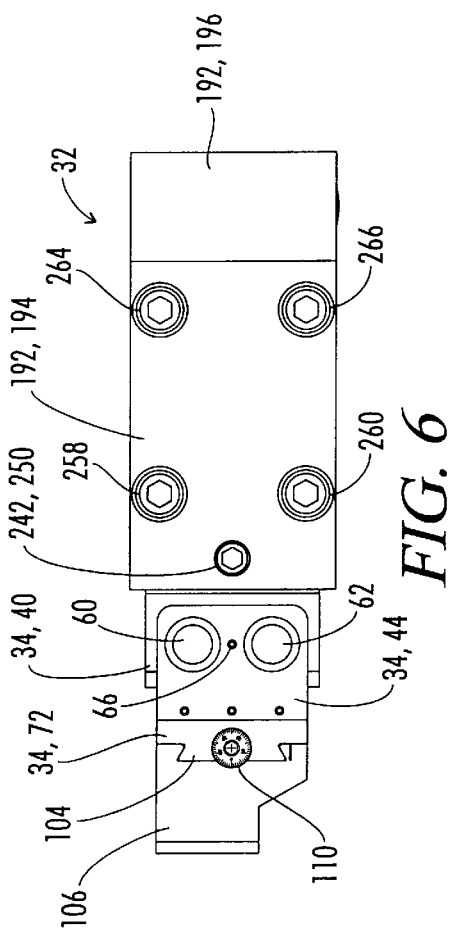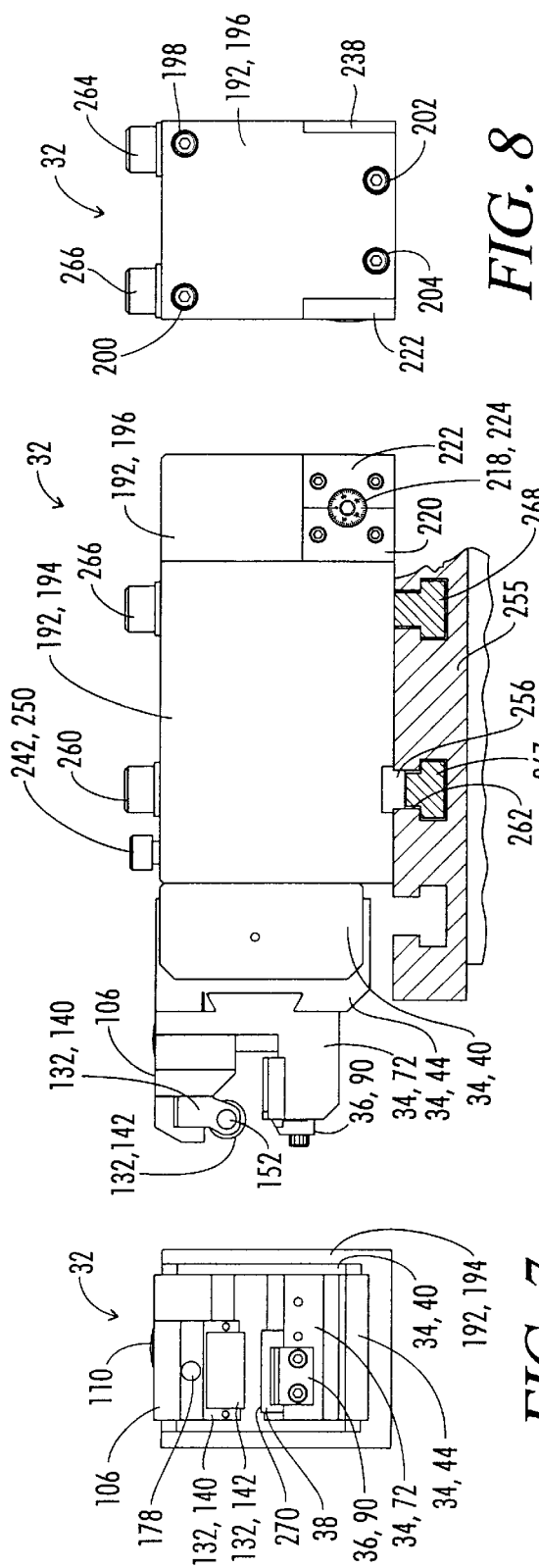

ADJUSTABLE ALIGNMENT

This application is a division of U.S. patent application Ser. No. 09/016,472 filed Jan. 30, 1998 by Peterson et al. entitled TOOLHOLDER WITH FLOATING ROLLER, now U.S. Pat. No. 6,012,364.

BACKGROUND OF THE INVENTION

1. Field of the Invention

The present invention is directed generally to methods and apparatus for holding a cutting tool for an automatic machine tool.

2. Description of the Prior Art

Typical prior art toolholders are shown in the brochures entitled "C. J. Winter Model 108 Shavetool Holder" and "Davenport Ordering Guide—Screw Machine Tool Co., Inc." and in U.S. Pat. No. 2,364,320 to Schlitters. A cutting tool holder using micrometer adjusting screws for lateral and longitudinal positioning is shown in U.S. Pat. No. 3,566,723 to Oborne.

A typical prior art toolholder includes a supporting roller disposed opposite the cutting tool mounting fixture. That supporting roller, however, is fixed relative to the cutting tool mounting fixture once the distance therebetween has been adjusted to determine the finished dimension of the rotating workpiece. This can lead to an improper cutting of the workpiece as illustrated in the sequential series of FIGS. 1A–1C.

FIG. 1A schematically illustrates a rotating workpiece 10 prior to the same being engaged by a cutting tool.

In FIG. 1B a prior art toolholder 12 has engaged the workpiece 10. The toolholder 12 is schematically illustrated and includes a supporting roller 14, a cutting tool mounting fixture 16, and a cutting tool 18. The supporting roller 14 is carried by a cradle or other support structure 20.

In FIG. 1B, a situation has been schematically illustrated wherein a center line 22 of the roller 14 is not exactly parallel to a top cutting edge 24 of the cutting tool 18, or to a center line 26 of the rotating workpiece 10. FIG. 1B illustrates the situation where the top edge 24 of the cutting tool 18 has been properly aligned parallel to the center line 26 of the workpiece 10. However, upon engagement of the roller 14 with the workpiece 10 the roller 14 has slightly bent or deflected the workpiece 16 so that a reduced diameter portion 28 thereof now lies parallel to the center line 22 of roller 14, but is no longer parallel to the top cutting edge 24 of cutting tool 18. This causes the cutting tool 18 to make a tapered cut on the reduced diameter portion 28, thus resulting in a defective finished part 10 as shown in FIG. 1C having a machined surface 30 which is tapered rather than being cylindrical as desired.

Thus, it is seen, that there is a need for a toolholder device which can overcome the problem of the prior art illustrated in FIGS. 1A–1C.

These same prior art toolholders also are very difficult to adjust for initial alignment of the cutting tool 18 with the workpiece 10. The prior art toolholders include a shaft attached to a head. The shaft has a flat portion defined thereon which is engaged by two opposed machine screws which are offset from a centerline of the shaft. To adjust the rotational position of the shaft about its centerline, both screws must be adjusted. This requires the machine operator to use both hands, advancing a screw on one side and retracting the opposing screw on the other side.

Thus, there is also a need for an improved means of adjusting the initial alignment of the cutting tool.

SUMMARY OF THE INVENTION

Methods and apparatus are provided for overcoming the problems illustrated. A toolholder apparatus is provided which includes a head, a cutting tool mounting fixture attached to the head for holding a cutting tool, and a floating roller assembly pivotally mounted relative to the head, so that during cutting of the workpiece with the cutting tool, the floating roller assembly can pivot about a pivotal axis relative to the head to allow the roller assembly to align with the workpiece.

The floating roller assembly is preferably carried by a roller assembly support. The roller assembly support includes an abutment surface which limits pivotal movement thereof relative to the head of the toolholder. A resilient member is located between the abutment surface of the roller assembly support and the roller assembly so as to cushion pivotal movement of the roller and also so as to bias the roller toward a central pivotal position. The resilient member is preferably a flat sheet of elastomeric material sandwiched between the abutment surface of the roller assembly support and a second surface of the roller assembly itself.

This apparatus, and the methods of using the same, prevent distortion of the rotating workpiece due to any initial misalignment of the roller with the rotating workpiece, thereby resulting in an even cut of the rotating workpiece by a cutting tool held by the toolholder of the present invention.

In another aspect of the present invention, methods and apparatus are provided for improving the precision and ease with which the initial alignment of the cutting tool with the rotating workpiece can be accomplished. In this aspect, the toolholder includes a cylindrical shaft extending from the head assembly, and includes an eccentric cam follower lug extending transversely from the shaft. The toolholder includes a mounting block having a cylindrical bore dispose therethrough, with the shaft being received in the bore of the mounting block. A cam piece is slideably disposed within the mounting block. The cam piece is engaged with the eccentric cam follower lug so that the shaft is rotated relative to the mounting block as the cam piece slides relative to the mounting block. A cam piece position adjuster connects the cam piece to the mounting block. This adjuster has an adjustable threaded engagement with the cam piece so that rotation of the adjuster relative to the mounting block varies the threaded engagement of the adjuster with the cam piece and slides the cam piece relative to the mounting block. Thus, by the rotation of one and only one bi-directional threaded adjuster of the toolholder, the adjustment of the alignment of the cutting tool relative to the elongated rotating workpiece can be accomplished by a human operator using only a single hand engaging the adjuster with an appropriate tool .

Thus, a first object of the present invention is the provision of methods and apparatus for holding a cutting tool for a multi-spindle bar machine.

Another object of the present invention is the provision of such methods and apparatus including a floating roller assembly which automatically aligns itself with the rotating workpiece upon engagement therewith so as to prevent distortion of the workpiece due to engagement thereof by the roller.

Yet another object of the present invention is the prevention of distortion of the rotating workpiece due to any initial misalignment of a roller of a toolholder with the rotating workpiece, thereby preventing uneven cutting of the rotating workpiece by a cutting tool which has been previously aligned with the workpiece.

Still another object of the present invention is the provision of methods and apparatus for initial alignment of the cutting tool with the rotating workpiece.

Numerous other objects, features and advantages of the present invention will be readily apparent to those skilled in the art after a reading of the following disclosure when taken in conjunction with the accompanying drawings.

BRIEF DESCRIPTION OF THE DRAWINGS

FIG. 5 is a side elevation view of the toolholder apparatus of the present invention showing the same mounted upon a tool slide of a multi-spindle bar machine.

FIG. 6 is a top plan view of the toolholder apparatus of FIG. 5.

FIG. 7 is a left end elevation view of the toolholder apparatus of FIG. 5.

FIG. 8 is a right end elevation view of the toolholder apparatus of FIG. 5.

DETAILED DESCRIPTION OF THE PREFERRED EMBODIMENT

The Head Assembly

Figure 2A:
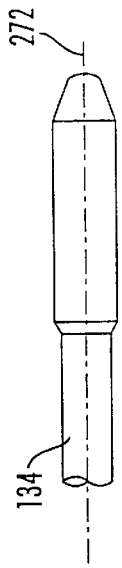
FIG. 2A illustrates a workpiece to be used with the toolholder of the present invention.
Figure 2B:
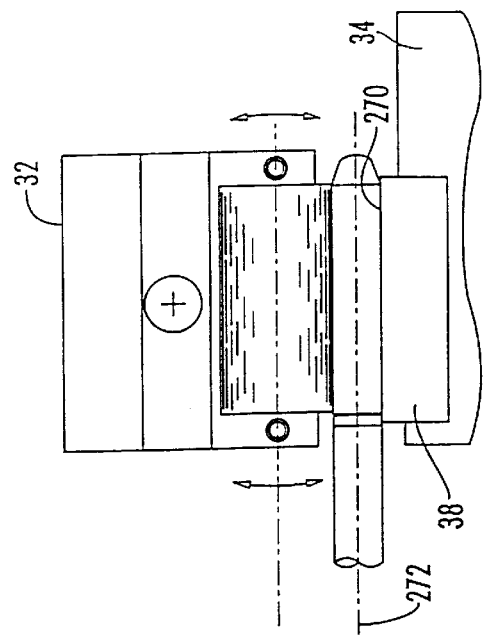
FIG. 2B illustrates the toolholder of the present invention in engagement with the workpiece, wherein the floating roller can rotate into alignment with the rotating workpiece.

The toolholder apparatus of the present invention is shown in FIGS. 3 through 8 and is generally designated by the numeral 32. The toolholder apparatus 32 includes a head assembly generally designated the by numeral 34. A cutting tool mounting fixture 36 is attached to the head assembly 34 for holding a cutting tool insert 38. The particular cutting tool insert 38 illustrated herein is of the type commonly referred to as a shave tool and the toolholder 32 is of the type which is often referred to as a shave toolholder 32.

The head assembly 34 includes a yoke 40 having a cylindrical shaft 42 rigidly attached thereto and extending therefrom. The head assembly 34 further includes a riser block 44 which is mounted upon the yoke 40 in the following manner.

The yoke 40 includes a solid yoke body 46 (see FIG. 4) having first and second parallel vertical bores 48 and 50 defined therein. The riser block 44 includes upper and lower flanges 52 and 54 which are received about the solid block portion 46 of yoke 40. The upper flange 52 has flange bores 56 and 58 therethrough which align with the bores 48 and 50 of solid block portion 46. First and second cylindrical pins 60 and 62 are received through upper flange 52 and through the bores 48 and 50, respectively, of solid portion 46 of yoke 40, to connect the riser block 44 to the yoke 40. A locking screw 63 disposed in a threaded screw hole 65 of yoke 40 holds the pin 62 in place relative to the yoke 40. A similar locking screw (not shown), holds pin 60 in place.

A spring member 64 is disposed between a lower surface 61 of solid member 46 and the lower flange 54 of riser block 44, and is held in receiving cavities (not shown) of those components in order to bias the riser block 44 downwardly relative to yoke 40. As is further described below, upon engagement of the roller assembly with the rotating workpiece, the roller assembly as carried by the riser block 44 rolls upward on to the rotating workpiece, thus causing the riser block 44 to slide upward on pins 60 and 62 relative to yoke 40 thus compressing the spring member 64.

A nylon setscrew 66 is disposed through a threaded screw hole 68 of upper flange 52 to engage an upper surface 70 of solid block portion 46 to limit a downward position of riser block 44 relative to yoke 40.

The head assembly 34 further includes a head 72 carried by the riser block 44. A forward face 74 of riser block 44 has an undercut groove 76 defined therein for receiving a dovetail 78 defined upon a back side of head 72. A pair of setscrews 80 and 82 disposed through the upper flange 52 of riser block 44 engage the dovetail 78 to hold the head 72 in place relative to riser block 44.

A stop block 84 is attached to the lower flange 54 of riser block 44 with screw 86 for engagement with dovetail 78 of head 72 to define the lateral position of head 72 relative to riser block 44.

The cutting tool mounting fixture 36 includes an anvil 88 and a clamp 90. The anvil 88 is attached to a lower flange 92 of head 72 by a pair of anvil screws 94 and 96. The clamp 90 is attached to head 72 by a pair of clamp screws 98 and 100 which thread into the lower flange 92 of head 72. The cutting tool insert 38 is clamped between the clamp 90 and anvil 88 to hold the same in place relative to the head assembly 34.

The head 72 includes a vertical flange 102 having a vertical dovetail 104 defined thereon. A roller assembly support 106 has a vertical undercut groove 108 defined in a back face thereof, and the vertical dovetail 104 of mounting block 72 is received within the undercut groove 108 of roller assembly support 106 so as to mount the roller assembly support 106 upon the head 72 of head assembly 34.

The vertical position of the roller assembly support 106 upon the head 72 is adjustable by means of a dial screw 110 which an also be referred to as an adjustable connector 110.

Figure 11:
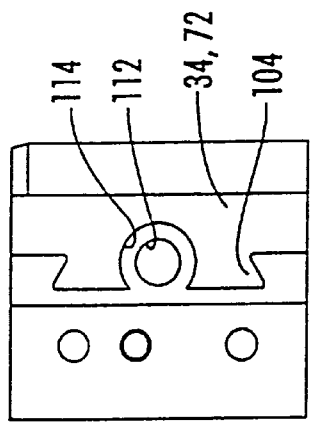
FIG. 11 is a top plan view of the head of the toolholder.
Figure 12:
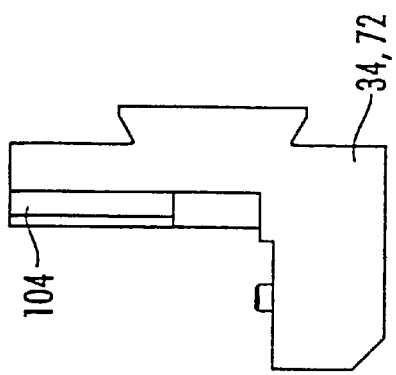
FIG. 12 is an elevation view of the head of FIG. 11.

The dial screw 110 is threadably received in a threaded bore 112 (see FIG. 11) of head 72 with a cylindrical dial screw head 113 slideably received within a smooth counter bore 114 defined at the upper end of threaded bore 112 in head 72.

Figure 9:
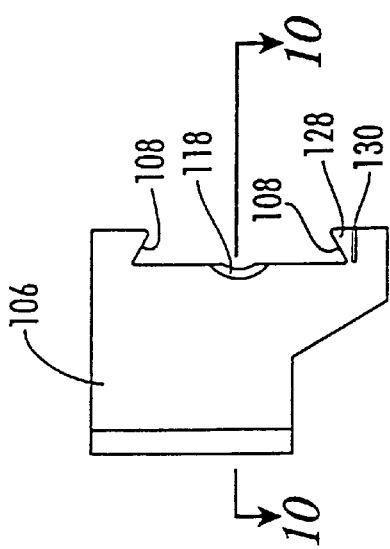
FIG. 9 is an enlarged top plan view of the roller assembly support.
Figure 10:
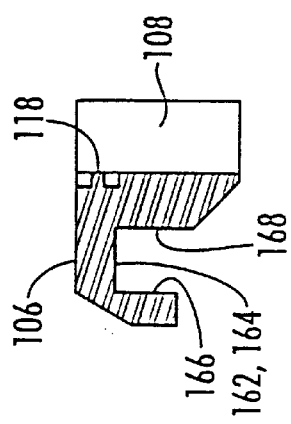
FIG. 10 is a vertical section view of the roller assembly support of FIG. 9 taken along line 10—10 of FIG. 9.

The dial screw head 113 has a circumferential groove 116 (see FIG. 4) defined therein which receives an arcuate tongue 118 defined in the roller assembly support 106 as is best illustrated in FIGS. 9 and 10. Thus, as the dial screw 110 is rotated relative to the threaded bore 112 of head 72, the dial screw 110 will advance or withdraw from the threaded bore 112 carrying the roller assembly support therewith in a slideable fashion with the under cut groove 108 of roller assembly support 106 sliding upward relative to the vertical dovetail 104.

After the vertical position of roller assembly support 106 has been adjusted as desired upon the head 72, the roller assembly support 106 is locked in place relative to the head 72 by a pair of setscrews 120 and 122.

The setscrews 120 and 122 thread into bores 124 and 126 of roller assembly support 106 and bear against a resiliently cantilevered lip 128 which in turn is biased by the setscrews 120 and 122 into clamping engagement with the vertical dovetail 104 of head 72. The cantilevered lip 128 is created by a vertical cut 130 in the roller assembly support 106 as best seen in FIG. 9.

The Floating Roller Assembly

A floating roller assembly 132 is pivotally mounted relative to the head assembly 34 and the roller assembly support 106 so that during the cutting of a rotating workpiece 134 with the cutting tool 38, the roller assembly 132 can pivot about a pivotal axis 136 relative to the head assembly 34 to allow the floating roller assembly 132 to align with the rotating workpiece 134.

The dial screw or adjustable connector 110 is located between the floating roller assembly 132 and the head assembly 34 so that a distance between the floating roller assembly 132 and the cutting tool 38 can be adjusted with the adjustable connector 110 to adjust a finished dimension 138 (see FIG. 2C) on the workpiece 134.

The floating roller assembly 132 includes a roller cradle 140, and a roller 142. The roller cradle 140 includes opposed arms 144 and 146 having horizontal bores 148 and 150 defined therethrough. The roller 142 is received between arms 144 and 146 and is mounted upon a roller pin 152. Roller 142 has a cylindrical bore 154 defined therethrough through which the pin 152 is received. The pin 152 has the ends thereof received in the bores 148 and 150 of arms 144 and 146 of roller cradle 140. Pin 152 is held in place by setscrews 156 and 158. The pin bore 154 is dimensioned so that the roller 142 can freely roll upon pin 152.

A center line 160 of pin 152 and roller 142 defines a rotational axis 160 of the roller 142.

As is best seen in FIG. 10, the roller assembly support 106 has a downwardly open square cut groove 162 defined therein by a downward facing planar surface 164 and opposed side facing planar surfaces 166 and 168.

The roller cradle 140 has a substantially boxed shaped central portion 170 (see FIG. 4) which has a flat upward facing surface 172 and front and rear side surfaces 174 and 176 which are closely received within the square cut groove 162 of roller assembly support 106.

A pivot pin 178 provides a pivotal connection between the roller assembly support 106 and the roller cradle 140 of floating roller assembly 132.

When the roller cradle 140 is disposed within the square cut groove 162 of roller assembly support 106, the pivot pin 178 is then disposed through a bore 180 defined through the side wall 166, a bore 182 disposed through the boxed shaped central portion 170 of roller cradle 140 and into a blind bore (not shown) disposed in the side wall 168 (see FIG. 10) of roller assembly support 106. Bore 180 is slightly smaller than pin 178, creating a mild interference fit therebetween. Bore 182 is slightly larger than pin 178, so roller cradle 140 pivots freely on pin 178.

The pivotal axis 136 of pivot pin 178 is transverse to and spaced apart from the rotational axis 160 of roller 142.

Referring again to FIG. 10, the downward facing planar surface 164 of square cut groove 162 may be defined as an abutment surface of roller assembly support 106 which limits pivotal movement of the roller cradle 140 and the roller 142 relative to the head assembly 34.

A resilient member 184 is located between the abutment surface 164 and the roller cradle 140 to cushion movement of the roller cradle 140 toward the abutment surface 164. The upward facing surface 172 of the boxed shaped central portion 170 of roller cradle 140 may be described as a second planar surface 172. The resilient member 184 is preferably a flat sheet of elastomeric material 184 which is sandwiched between the planar abutment surface 164 of roller assembly support 106 and the upward facing planar surface 172 of roller cradle 140.

It is noted that the resilient sheet 184 serves several purposes. One purpose is to cushion pivotal movement of the roller cradle 140 relative to roller assembly support 106. A second purpose is to bias the roller cradle 140 toward a central pivotal position relative to the roller assembly support 106. Also the sheet 184 fills the space between surfaces 164 and 172, and serves as a seal to prevent debris from being caught between those surfaces. If debris were trapped between those surfaces, the free pivoting movement of roller cradle 140 would be inhibited.

In a preferred embodiment, the elastomeric sheet member 184 has a thickness of approximately 1/16 inch and the total pivotal movement of roller cradle 140 relative to roller assembly support 106 about the pivotal axis 136 is preferably a relatively small arc in a range of from about 1° to about 1°30'.

Shaft Adjustment Mechanism

Figure 3:
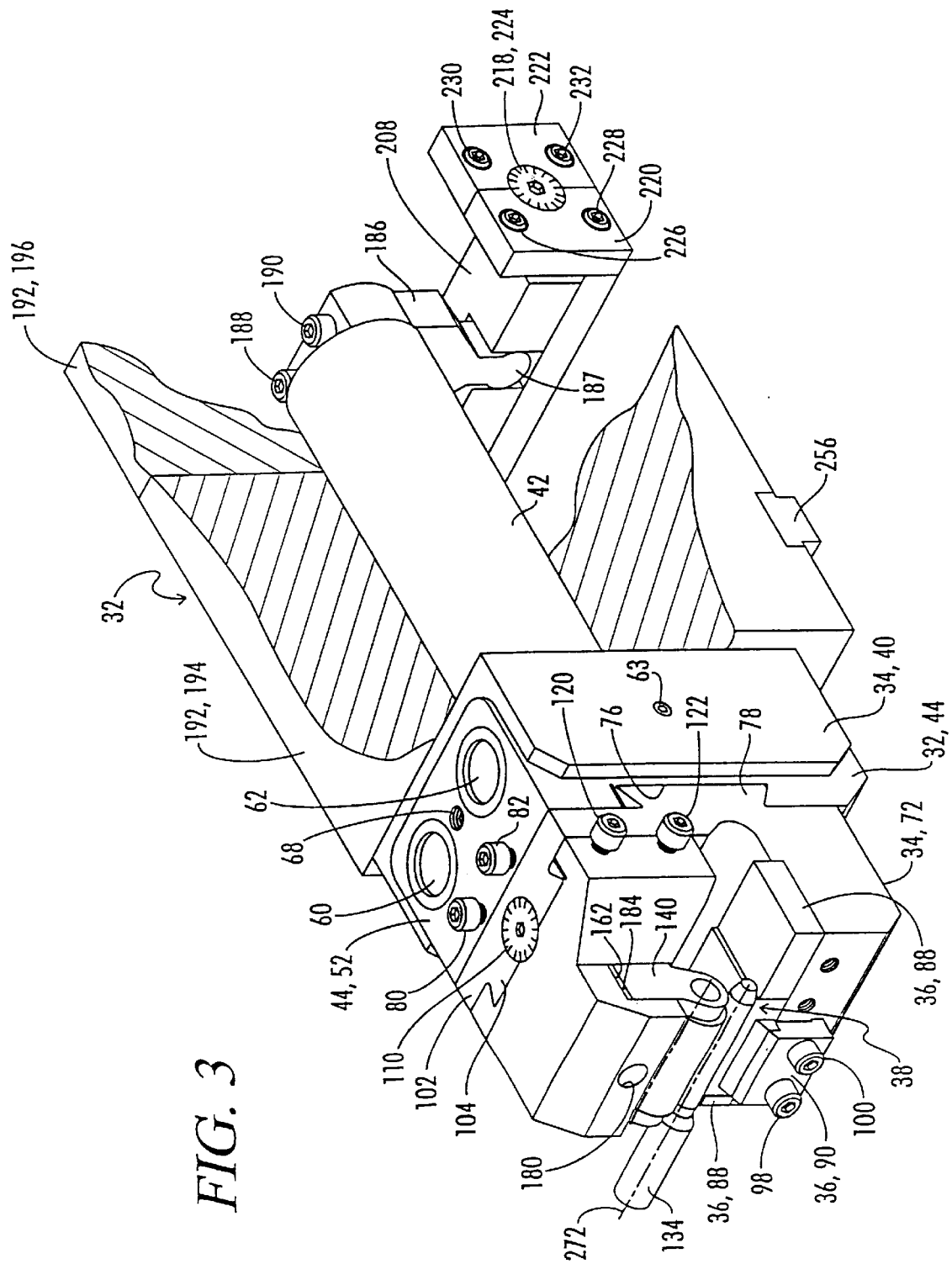
FIG. 3 is an isometric drawing of the toolholder of the present invention having a portion of the mounting block cut away to illustrate the internal construction of certain components.
Figure 4:
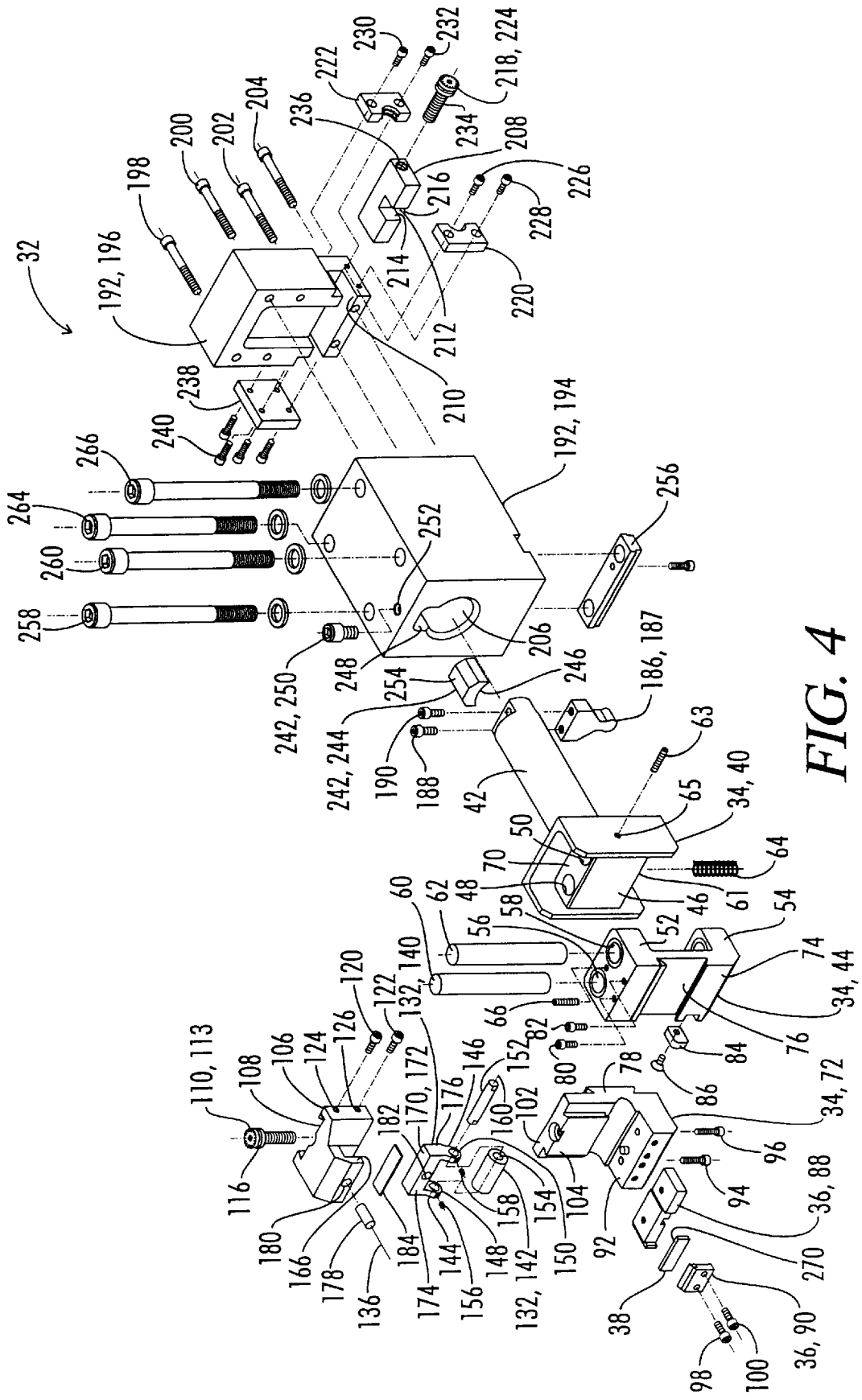
FIG. 4 is an exploded view of the toolholder of FIG. 3.

Referring now primarily to FIGS. 3 and 4, and particularly to the right hand sides thereof, the mounting block and shaft adjustment portion of the toolholder 32 will be described.

As previously noted, a cylindrical shaft 42 extends rearward from the yoke 40 of head assembly 34. An eccentric cam follower lug 186 is detachably attached to shaft 42 by machine screws 188 and 190. The eccentric cam follower lug extends transversely from the shaft 42. The eccentric cam follower lug 186 includes a partially cylindrical end piece 187.

The toolholder 32 includes a mounting block 192 having a mounting block body 194 and a mounting block end cap 196 detachably attached to the mounting block body 194 by machine screws 198, 200, 202 and 204.

The mounting block body 194 has a cylindrical bore 206 defined therethrough. The shaft 42 is disposed through the cylindrical bore 206.

As is seen in FIG. 3, the head assembly 34 of toolholder 32 and the eccentric cam follower lug 186 are disposed on opposite sides of the mounting block body 194 with the eccentric cam follower lug 186 being disposed within the mounting block end cap 196.

A cam piece 208 is a substantially rectangular block shaped piece which is disposed within a complimentary shaped forward facing square cut groove 210 defined in the mounting block end cap 196.

The cam piece 208 has a forward facing notch 212 cut therein and defined by opposing planar walls 214 and 216 so that the partially cylindrical end piece 187 of eccentric cam follower lug 186 has a sliding machine fit engagement with both of the opposing planar walls 214 and 216 as seen in FIG. 3. Thus, the cam piece 208 is engaged with the eccentric cam follower lug 186 so that the shaft 42 is rotated relative to the mounting block 192 as the cam piece 208 slides laterally relative to the mounting block 192. More particularly, the close machine fit engagement of the opposing planar walls 214 and 216 with the partially cylindrical end piece 187 controls rotational position of the shaft 42 within the mounting block 192, said rotational position being defined by the position of the cam piece 208 relative to the mounting block 192.

A dial screw 218, which functions as a cam piece position adjuster 218, connects the sliding cam piece 208 to the mounting block 192 in the following fashion.

Front and back adjusting screw retainers 220 and 222, respectively, are place about a head 224 of dial screw 218, and are attached to the mounting block end cap 196 by machine screws 226, 228, 230 and 232.

A threaded portion 234 of dial screw 218 threadedly engages a threaded bore 236 of cam piece 208. Thus, as the head 224 of dial screw 218, which is captured between retainers 220 and 222, is rotated, the position of the cam piece 208 translates laterally.

Thus the rotation of the dial screw 218, which can be described as rotating one and only one bi-directionally threaded adjuster 218, adjusts the sliding position of cam piece 208 and thus adjusts the rotational position of shaft 42 and the alignment of recutting tool 38 relative to the elongated rotating workpiece 134. This can be accomplished by a human operator using one and only one hand to engage the dial screw 218 with an appropriate tool such as an Allen wrench.

The sliding cam piece 208 and the mounting block end cap 196 and dial screw 218 are so arranged and constructed that the shaft 42 can be rotated through an arc of at least about 2°.

The other side of the mounting block end cap 196 is closed by a stop plate 238 attached thereto by a plurality of machine screws such as 240.

The toolholder 32 further includes a shaft locking mechanism 242 constructed to selectively lock the shaft 42 in place within the bore 206 of mounting block body 194. The shaft locking mechanism includes an arcuate shape shaft lock or brake piece 244 which has an arcuate surface 246 which is closely received about the outer cylindrical surface of shaft 42. The lock piece 244 is received within an eccentric offset cavity 248 defined in mounting block body 194 and communicated with the bore 206 thereof. A set screw 250 is disposed through a threaded screw bore 252 in the upper portion of mounting block body 194 and engages a top surface 254 of lock piece 244 to press the lock piece 244 firmly against the outer surface of shaft 42 to lock shaft 42 rotationally in place relative to mounting block body 194.

The toolholder 32 is mounted to a tool slide 255 of a conventional multiple spindle bar machine in a conventional manner. This is best seen in FIG. 5.

A mounting key 256 is held in place relative to mounting block body 194 by bolts 258 and 260, which extend through key 256 and thread into an inverted T-shaped block 267 received in groove 262. The mounting key 256 is received within a groove 262 defined in the tool slide 255 as best seen in FIG. 5. The toolholder 32 is held in place relative to the tool slide 255 by bolts 264 and 266 which attach to an inverted T-shaped block 268 as seen in FIG. 5.

Methods

It should now be apparent that the apparatus of the present invention can be utilized in a fashion to provide improved methods of machining elongated rotating workpieces on multi-spindled automatic bar machines with a cutting tool held in a toolholder. The apparatus of the present invention is generally utilized in the following manner.

First, it is desired to align the top cutting edge 270 of the cutting tool insert 38 with the elongated rotating workpiece 134 and particularly with a longitudinal axis of rotation 272 of the workpiece 134. Typically, to provide a straight cylindrical finished outer surface on the rotating workpiece 134, the top edge 270 of cutting tool insert 38 will be aligned parallel to the rotational axis 272 of rotating workpiece 134.

This is accomplished with the methods and apparatus of the present invention in a very simple manner. The operator of the equipment merely engages the dial screw 218 with an appropriate tool such as an Allen wrench, and the operator can with a single hand rotate the dial screw 218 clockwise or counter clockwise to slide the cam piece 208. The sliding cam piece 208 moves lug 186 attached to shaft 42 thus rotating the shaft 42 to adjust the alignment of the top edge 270 of the cutting tool insert 38 relative to the rotational axis 272 of the elongated rotating workpiece 134.

This adjustment can be made by the operator with a single hand, and can be adjusted in either direction by the permitted bi-directional rotation of the dial screw 218 back and forth to align the cutting tool insert 36.

After the shaft 42 is rotationally adjusted to align the top edge 270 of cutting tool insert 38 as desired, the shaft 42 is locked in position by tightening the set screw 250 of shaft locking mechanism 242.

After the alignment of the cutting tool insert 36 as just described, the toolholder 32 is ready to be engaged with the rotating workpiece 134.

As will be understood by those skilled in the art, the conventional multiple spindled bar machine includes a mechanism which moves a plurality of tool slides such as 255 toward and away from a plurality of rotating workpieces as the rotating workpieces are indexed about a central axis of the machine tool.

To engage the cutting tool 38 with the rotating workpiece 134, the tool slide 255 is translated laterally to the left from the position shown in FIG. 5 to move the roller 142 and cutting tool insert 38 into engagement with the rotating workpiece 134.

As will be understood by those skilled in the art, the roller 142 will first engage the rotating workpiece 134 before the cutting tool insert 38.

With the pivoted floating roller assembly 132 of the present invention, as the roller 142 is engaging with the rotating workpiece 134, the roller will first automatically move into conforming alignment with the rotating workpiece 134 by pivotal movement of the roller assembly 132 about pivotal axis 136 of pivot pin 178. Then, the roller 142 rolls upward upon the rotating workpiece 134 pulling the top edge 270 of cutting tool insert 38 into an even cutting engagement with the rotating workpiece 134.

Figure 2C:
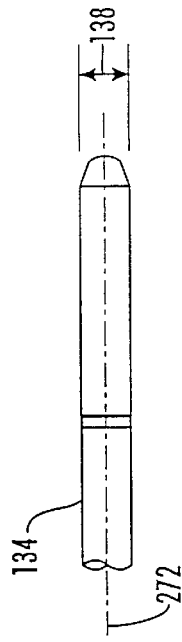
FIG. 2C shows the resulting workpiece having been machined by the apparatus illustrated in FIG. 2B, thus avoiding any taper on the workpiece.
Figure 1A:
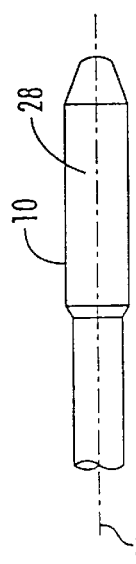
FIG. 1A illustrates a workpiece.
Figure 1B:
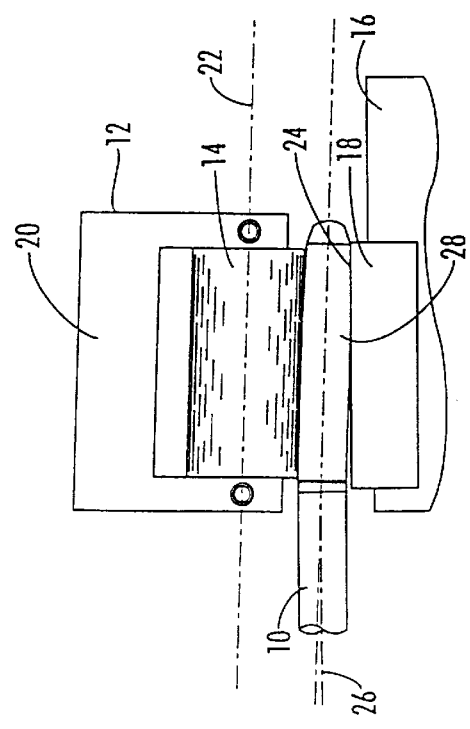
FIG. 1B illustrates the workpiece in engagement with a prior art toolholder having misalignment between the roller and the workpiece.
Figure 1C:
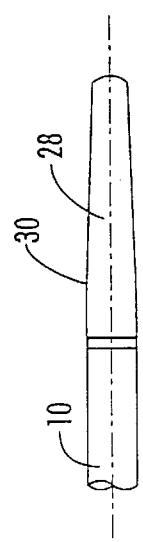
FIG. 1C illustrates the resulting tapered workpiece of the prior art, which results from the misalignment illustrated in FIG. 1B.

The conforming alignment which is automatically provided between the floating roller assembly 132 and the rotating workpiece 134 prevents distortion of the rotating workpiece, such as that illustrated for the prior art in FIG. 1B, due to any initial misalignment which might exist between the roller 142 and the rotating workpiece 134. This results in an even cutting of the outer surface of the rotating workpiece 134 so as to provide a straight cylindrical cut having an outer surface 274 as shown in FIG. 2C.

The pivotal movement of the roller 142 relative to the head assembly 34 is limited by the abutment surface 164 of groove 162 of roller assembly support 106. Furthermore, this movement is cushioned by the presence of the resilient elastomeric sheet 184. That same resilient elastomeric sheet 184 has previously biased the roller assembly 132 toward a central position thereof within its allowed arc of pivotal movement.

The methods and apparatus of the present invention provide a system whereby the initial alignment of the cutting tool with the rotating workpiece can be easily and precisely achieved by the machine operator by a very simple one handed adjustment of the dial screw 218. Subsequently, as the roller assembly and cutting tool insert are moved into engagement with the rotating workpiece, the roller assembly 132 automatically aligns itself with the rotating workpiece 134 thus preventing any distortion thereof and allowing the previously aligned cutting tool insert 38 to move into an even cutting engagement with the rotating workpiece 134.

Thus is it seen that the methods and apparatus of the present invention readily achieve the ends and advantages mentioned as well as those inherent therein. While certain preferred embodiments of the present invention have been illustrated and described for the purposes of the present disclosure, numerous changes in the arrangement and construction of parts and steps may be made by those skilled in the art, which changes are encompassed within the scope and spirit of the present invention as defined by the appended claims.

What is claimed is:

1. A cutting tool mounting apparatus, comprising:
   a toolholder including a head assembly for holding a cutting tool, a cylindrical shaft extending from said head assembly and an eccentric cam follower lug extending transversely from said shaft, the eccentric cam follower lug being attached to the shaft for rotation with the shaft;
   a mounting block having a cylindrical bore disposed therethrough, said shaft being received in said bore of said mounting block;
   a cam piece slidably disposed within said mounting block, said cam piece being engaged with said eccentric cam follower lug so that said shaft is rotated relative to said mounting block as said cam piece slides relative to said mounting block;
   cam piece position adjuster connecting said cam piece to said mounting block;
   wherein said adjuster has an adjustable threaded engagement with said cam piece so that rotation of said adjuster relative to said mounting block varies the threaded engagement of said adjuster with said cam piece and slides said cam piece relative to said mounting block.

2. The apparatus of claim 1, wherein said adjuster is a dial screw.

3. The apparatus of claim 1, wherein;
   said mounting block includes a mounting block body and a mounting block end cap detachably attached to said mounting block body;
   said cylindrical bore of said mounting block is defined through said mounting block body;
   said head assembly and said eccentric cam follower lug of said toolholder are disposed on opposite sides of said mounting block body, with said eccentric cam follower lug being disposed in said mounting block end cap; and
   said eccentric cam follower lug is detachably attached to said shaft.

4. The apparatus of claim 1, wherein:
   said cam piece and said cam piece position adjuster are constructed such that said shaft is rotatable through an arc of at least about 2°.

5. The apparatus of claim 1, further comprising:
   a shaft lock constructed to selectively lock said shaft in position within said bore of said mounting block.

6. The apparatus of claim 1, wherein:
   said cam piece has a cavity defined therein by first and second opposing planar walls; and
   said eccentric cam follower lug includes a partially cylindrical end piece closely received between said opposing planar walls so that said partially cylindrical end piece engages both of said opposing planar walls to control rotational position of said shaft within said mounting block, said rotational position being defined by the position of said cam piece relative to said mounting block.

7. A method of adjusting an alignment of a cutting tool with an elongated rotating workpiece on a multi-spindle automatic bar machine, said method comprising the steps of:
   (a) rotating one and only one bi-directional threaded adjuster of a toolholder holding the cutting tool; and thereby
   (b) adjusting the alignment of a cutting edge of the cutting tool relative to a rotational axis of the elongated rotating workpiece to reduce any non-parallel alignment of the cutting edge relative to the rotational axis.

8. The method of claim 7, wherein:
   step (a) is accomplished by a human operator using only one hand to grasp and rotate the adjuster.

9. The method of claim 7, wherein:
   step (a) includes bi-directionally rotating the adjuster back and forth to align the cutting tool.

10. The method of claim 7, further comprising:
    in response to step (a), sliding a cam piece of said toolholder;
       with said sliding cam piece, moving an eccentric cam follower lug attached to a rotatable shaft of said toolholder; and
    thereby rotating the shaft to accomplish said step (b) of adjusting the alignment of the cutting tool.

11. The method of claim 7, further comprising:
    after step (b), locking said cutting tool in a fixed rotational position relative to said toolholder.

12. A cutting tool mounting apparatus, comprising:
    a toolholder including a head assembly for holding a cutting tool, a cylindrical shaft extending from said head assembly and an eccentric cam follower lug extending transversely from said shaft, the eccentric cam follower lug being attached to the shaft for rotation with the shaft;
    a mounting block having a cylindrical bore disposed therethrough, said shaft being received in said bore of said mounting block;
    a cam piece slidably disposed within said mounting block, said cam piece being engaged with said eccentric cam follower lug so that said shaft is rotated relative to said mounting block as said cam piece slides relative to said mounting block;
    a cam piece position adjuster connecting said cam piece to said mounting block;
    and wherein:
       said mounting block includes a mounting block body and a mounting block end cap detachably attached to said mounting block body;

said cylindrical bore of said mounting block is defined through said mounting block body;

said head assembly and said eccentric cam follower lug of said toolholder are disposed on opposite sides of said mounting block body, with said eccentric cam follower lug being disposed in said mounting block end cap; and said eccentric cam follower lug is detachably attached to said shaft.

13. A cutting tool mounting apparatus, comprising:

a toolholder including a head assembly for holding a cutting tool, a cylindrical shaft extending from said head assembly and an eccentric cam follower lug extending transversely from said shaft, the eccentric cam follower lug being attached to the shaft for rotation with the shaft;

a mounting block having a cylindrical bore disposed therethrough, said shaft being received in said bore of said mounting block;

a cam piece slidably disposed within said mounting block, said cam piece being engaged with said eccentric cam follower lug so that said shaft is rotated relative to said mounting block as said cam piece slides relative to said mounting block;

a cam piece position adjuster connecting said cam piece to said mounting block;

and wherein:

said cam piece has a cavity defined therein by first and second opposing planar walls; and said eccentric cam follower lug includes a partially cylindrical end piece closely received between said opposing planar walls so that said partially cylindrical end piece engages both of said opposing planar walls to control rotational position of said shaft within said mounting block, said rotational position being defined by the position of said cam piece relative to said mounting block.

* * * * *